US011231205B2

(12) United States Patent
Cosby, II et al.

(10) Patent No.: US 11,231,205 B2
(45) Date of Patent: Jan. 25, 2022

(54) USING HEAT RECOVERED FROM HEAT SOURCE TO OBTAIN HIGH TEMPERATURE HOT WATER

(71) Applicant: TRANE INTERNATIONAL INC., Davidson, NC (US)

(72) Inventors: Ronald Maurice Cosby, II, La Crosse, WI (US); Stephen A. Kujak, Brownsville, MN (US); Kenneth J. Schultz, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 466 days.

(21) Appl. No.: 15/781,943

(22) PCT Filed: Dec. 8, 2016

(86) PCT No.: PCT/US2016/000117
§ 371 (c)(1),
(2) Date: Jun. 6, 2018

(87) PCT Pub. No.: WO2017/099814
PCT Pub. Date: Jun. 15, 2017

(65) Prior Publication Data
US 2018/0363947 A1 Dec. 20, 2018

Related U.S. Application Data (60) Provisional application No. 62/264,830, filed on Dec. 8, 2015.

(51) Int. Cl.
F24H 4/04 (2006.01)
F25B 7/00 (2006.01)
(Continued)

(52) U.S. Cl.
CPC .............. *F24H 4/04* (2013.01); *C09K 5/044* (2013.01); *C09K 5/045* (2013.01); *F25B 6/04* (2013.01);
(Continued)

(58) Field of Classification Search
CPC ..... F24H 4/04; F24H 4/02; F24H 4/00; F25B 6/04; F25B 7/00; F25B 29/003;
(Continued)

(56) References Cited

U.S. PATENT DOCUMENTS 3,926,008 A * 12/1975 Webber ................ F25B 29/003
62/200
4,391,104 A 7/1983 Wendschlag
(Continued)

FOREIGN PATENT DOCUMENTS

CN 102032699 A 4/2011
CN 102686957 A 9/2012
(Continued)

OTHER PUBLICATIONS

International Search Report and Written Opinion, International Patent Application No. PCT/US2016/000117, dated Apr. 10, 2017 (14 pages).
Xu, Cheng Hai, Vacuum Cryogenics Technology and Equipment, 2010. (4 pages) Chinese Office Action of Chinese Patent Application No. 201680081196.9. (see below).
(Continued)

Primary Examiner — Joseph F Trpisovsky
(74) Attorney, Agent, or Firm — Hamre Schumann, Mueller & Larson, P.C.

(57) ABSTRACT

Heat is recovered from a heat source to heat water to high temperatures. Apparatuses, systems and methods are described to heat water to a high temperature by using heat, such as may be considered in some instances as waste heat, recovered from a heat source. The methods, systems, and apparatuses described utilize low pressure refrigerant(s) as a fluid to provide a refrigeration cycle that utilizes a source of
(Continued)

heat to heat water to a high temperature. The refrigeration cycle can be with or without a cascade cycle. The refrigerant cycle in some examples uses an oil free compressor.

19 Claims, 4 Drawing Sheets

(51) Int. Cl.
*F25B 30/02* (2006.01)
*C09K 5/04* (2006.01)
*F25B 6/04* (2006.01)
*F25B 29/00* (2006.01)
*F25B 25/00* (2006.01)

(52) U.S. Cl.
CPC .............. *F25B 7/00* (2013.01); *F25B 29/003* (2013.01); *F25B 30/02* (2013.01); *C09K 2205/126* (2013.01); *F25B 25/005* (2013.01); *F25B 2339/047* (2013.01); *F25B 2400/075* (2013.01); *F25B 2400/121* (2013.01); *Y02A 30/272* (2018.01); *Y02B 10/20* (2013.01); *Y02P 20/10* (2015.11)

(58) Field of Classification Search
CPC .. F25B 30/02; F25B 25/005; F25B 2339/047; F25B 2400/075; F25B 2400/121; C09K 5/044; C09K 5/045; C09K 2205/126
See application file for complete search history.

(56) References Cited

U.S. PATENT DOCUMENTS

| | | |
|---|---|---|
| 9,182,160 B2 | 11/2015 | Platt |
| 2009/0158761 A1 | 6/2009 | Wakamoto et al. |
| 2012/0216551 A1 | 8/2012 | Minor et al. |
| 2013/0219945 A1* | 8/2013 | Koge ........................ F24F 5/00 62/324.6 |
| 2014/0013790 A1* | 1/2014 | Asari ........................ F25B 1/00 62/335 |
| 2015/0121940 A1 | 5/2015 | Lee et al. |
| 2015/0135752 A1* | 5/2015 | Sugimoto ................ F25B 1/10 62/222 |
| 2015/0153086 A1 | 6/2015 | Takayama et al. |
| 2015/0226453 A1* | 8/2015 | Nomoto ............. F24D 19/0092 62/238.7 |
| 2016/0377326 A1* | 12/2016 | Masaki ................ C09K 5/044 62/56 |
| 2018/0201817 A1* | 7/2018 | Close ..................... C09K 5/045 |

FOREIGN PATENT DOCUMENTS

| | | |
|---|---|---|
| EP | 2320164 | 5/2011 |
| WO | 2009/003165 A1 | 12/2008 |

OTHER PUBLICATIONS

Office Action, Chinese Patent Application No. 201680081196.9, dated Jan. 3, 2020, with English translation of Search Report (8 pages).

* cited by examiner

USING HEAT RECOVERED FROM HEAT SOURCE TO OBTAIN HIGH TEMPERATURE HOT WATER

FIELD

Embodiments disclosed herein generally relate to recovering heat from a heat source to heat water to high temperatures. In particular, apparatuses, systems and methods are directed to heating water to a high temperature by using heat, such as may be considered in some instances as waste heat, recovered from a heat source.

BACKGROUND

Current high temperature hot water heating (e.g. >160 F) is generated through primarily natural gas or electric hot water heaters. There are applications where heating, ventilating, and air conditioning (HVAC) heat pumps are utilized for hot water up to 160 F but current refrigerants are typically limited from reaching higher temperatures due to decomposition issues or efficiency issues. $CO_2$ hot water heat pumps are currently used in some markets for residential or very light commercial applications but are typically very expensive. Natural gas or electric hot water heaters are limited in efficiency to coefficients of performance (COP) where COPs<1. Current hot water heater/boiler market is tens of billions of dollars globally. Improvements may be made to generating high temperature hot water.

SUMMARY

Embodiments disclosed herein generally relate to recovering heat from a heat source to heat water to high temperatures. In particular, apparatuses, systems and methods are directed to heating water to a high temperature by using heat, such as may be considered in some instances as waste heat, recovered from a heat source.

In an embodiment, methods, systems, and apparatuses are described that utilize low pressure refrigerant(s) as a fluid to provide a refrigeration cycle that also utilizes a source of heat from another refrigeration cycle to heat water to a high temperature.

In an embodiment, the source of heat recovered from the another refrigeration cycle is waste heat or heat that may otherwise be rejected or that would not have been recovered.

In an embodiment, the another refrigeration cycle may be, but is not limited to for example, a rooftop machine, a unitary rooftop machine, a chiller, a variable refrigerant flow (VRF) machine, and/or variable water flow (VWF) machine, a HVAC system or unit or equipment, and the like can provide the source of heat to create the high temperature hot water.

It will be appreciated that any suitable refrigeration and/or heating system or machine, which uses a heat exchange fluid such as for example a refrigerant, may be implemented as the source of heat.

In an embodiment, the high temperature hot water can include at or above 160° F., about 160° F. to 190° F., about 190° F. to 200° F., and in some cases higher temperatures depending on the available capacity, desire, and/or need. In an embodiment, the source of heat can provide at a temperature of about 100° F. to 160° F. which is used to heat or lift water to a desired temperature of the high temperature hot water. In an embodiment, the source of heat can be utilized to boost the temperature of the water to obtain the high temperature hot water.

In an embodiment, the source of heat, by selecting the appropriate refrigerant, is able to provide the high temperature hot water with or without a cascade system.

In an embodiment, one or more refrigeration cycles or circuits implemented herein utilized may be an oil free system, where the compressor does not employ oil.

In an embodiment, a refrigeration cycle herein utilizes a vapor compression refrigeration system comprised of a compressor, condenser, evaporator, and expansion device between the outlet of the condenser and the inlet of the evaporator to provide the high temperature hot water. The vapor compression system utilizes a low pressure refrigerant. In an embodiment, the vapor compression system may be implemented as the refrigeration cycle and/or as the another refrigeration cycle depending on whether there is cascading. In an embodiment, the vapor compression system is an existing system (e.g. an R-134a system) that is repurposed for use with the low pressure refrigerant to provide the source of heat which may be cascaded with the another refrigeration cycle or used alone without cascading.

In an embodiment, condenser refrigerant saturation temperatures of the vapor compression system are at or above 120° F. The high temperature application is plausible through the use of stable, low pressure refrigerants.

In an embodiment, the vapor compression system is implemented as the another refrigeration cycle as a hot water booster cycle, which is added-on to an existing refrigeration cycle, e.g. HVAC equipment, to provide a high efficiency option for hot water heating. Cycle COPs (depending upon waste heat temperatures and low pressure refrigerant choice) range from 3 to 7, thereby offering COP improvements four to nine times greater than typical hot water heating (gas and electric fired). In an embodiment, the low refrigerant(s) selected can have a COP of 3 to 7, and in some cases at least 5 and higher.

In an embodiment, the refrigeration cycle utilizes a vapor compression refrigeration system comprised of an oil free compressor, condenser, evaporator, and expansion device between the outlet of the condenser and the inlet of the evaporator to provide the high temperature hot water. The vapor compression system utilizes a low pressure refrigerant. In an embodiment, the oil free compressor is an oil free centrifugal compressor.

In an embodiment, such high temperature hot water may be used for various process applications, including but not limited to residential, domestic, light commercial, commercial, and industrial applications, and the like. In an embodiment, such applications can include but are not limited to air reheat, laundry, cemetery, and sanitation applications, and the like.

Among the various applications of the high temperature hot water, an integrated system can be implemented for providing the high temperature hot water to heat or reheat relatively low temperature, low humidity air (after dehumidification) up to a desired supply air temperature. Such an integrated solution can allow for a higher overall building cooling system efficiency through utilization of waste heat.

DRAWINGS

These and other features, aspects, and advantages of the will become better understood when the following detailed description is read with reference to the accompanying drawing, wherein.

While the above-identified figures set forth particular embodiments of recovering heat from a heat source to heat water to high temperatures, other embodiments are also contemplated, as noted in the descriptions herein. In all cases, this disclosure presents illustrated embodiments of recovering heat from a heat source to heat water to high temperatures are by way of representation but not limitation. Numerous other modifications and embodiments can be devised by those skilled in the art which fall within the scope and spirit of the principles of recovering heat from a heat source to heat water to high temperatures described and illustrated herein.

DETAILED DESCRIPTION

Embodiments disclosed herein generally relate to recovering heat from a heat source to heat water to high temperatures. In particular, apparatuses, systems and methods are directed to heating water to a high temperature by using heat, such as may be considered in some instances as waste heat, recovered from a heat source.

FIGS. 1 to 4 show examples of vapor compression refrigeration systems 100, 200, 300, 400 comprised of a compressor, condenser, evaporator, and expansion device between the outlet of the condenser and the inlet of the evaporator to provide high temperature hot water, for example to a building and/or industrial process and for various applications. The vapor compression system utilizes a low pressure refrigerant.

Figure 1:
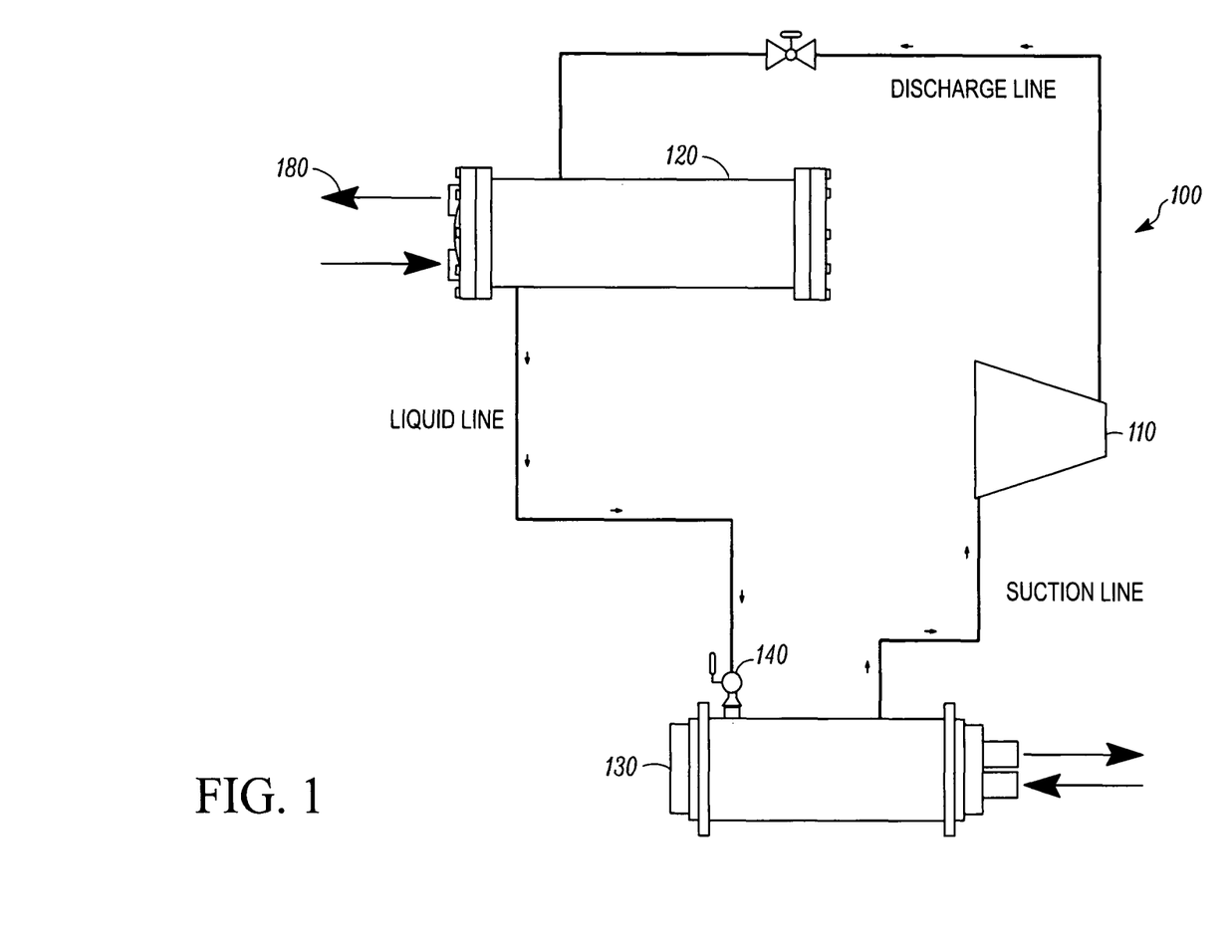
FIG. 1 is a schematic circuit of an embodiment of a vapor compression system which utilizes a low pressure refrigerant and which can provide high temperature hot water.
Figure 2:
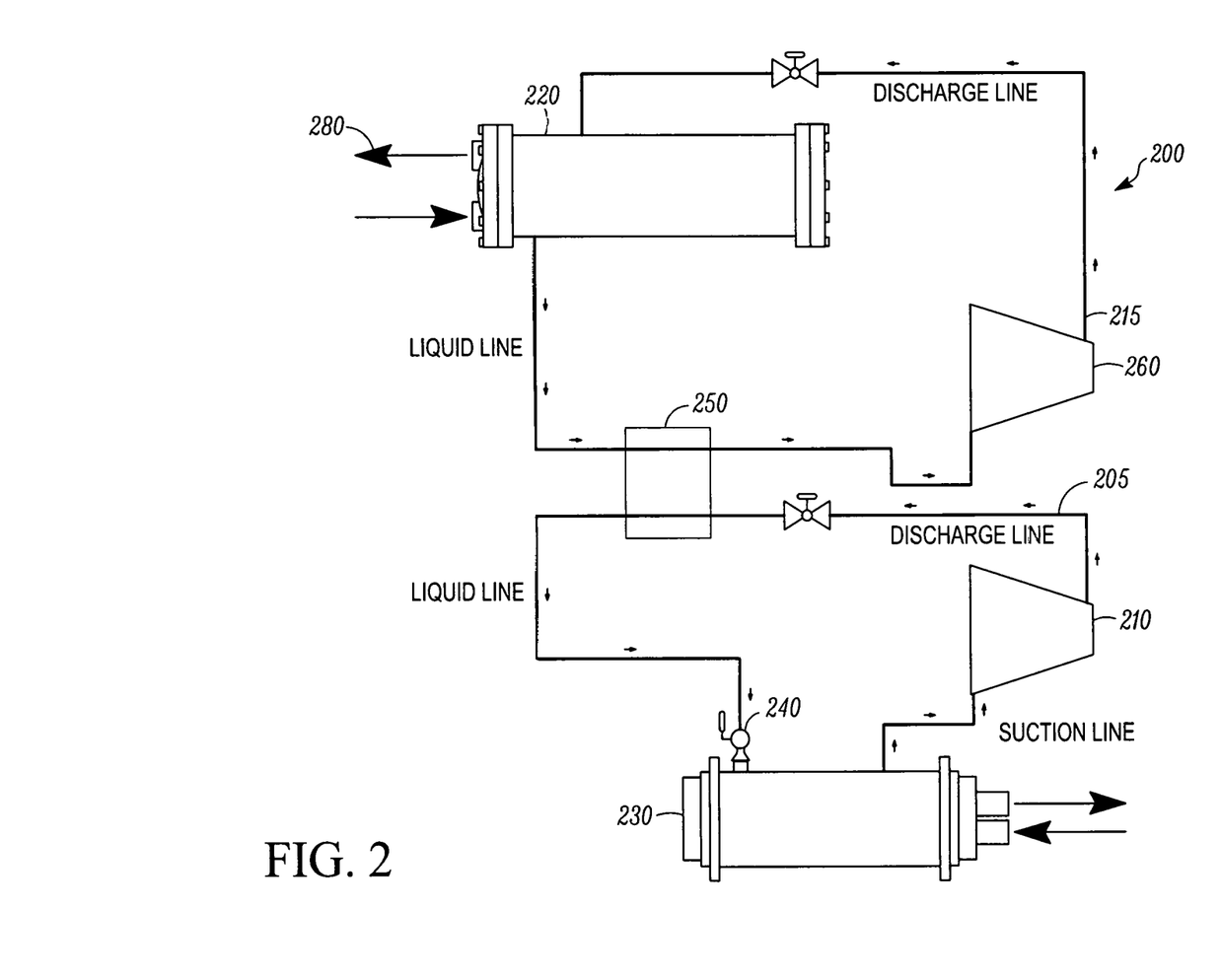
FIG. 2 is a schematic circuit of an embodiment of a vapor compression system which utilizes a low pressure refrigerant and which can provide high temperature hot water. The vapor compression system is configured as an embodiment of a cascade system.
Figure 3:
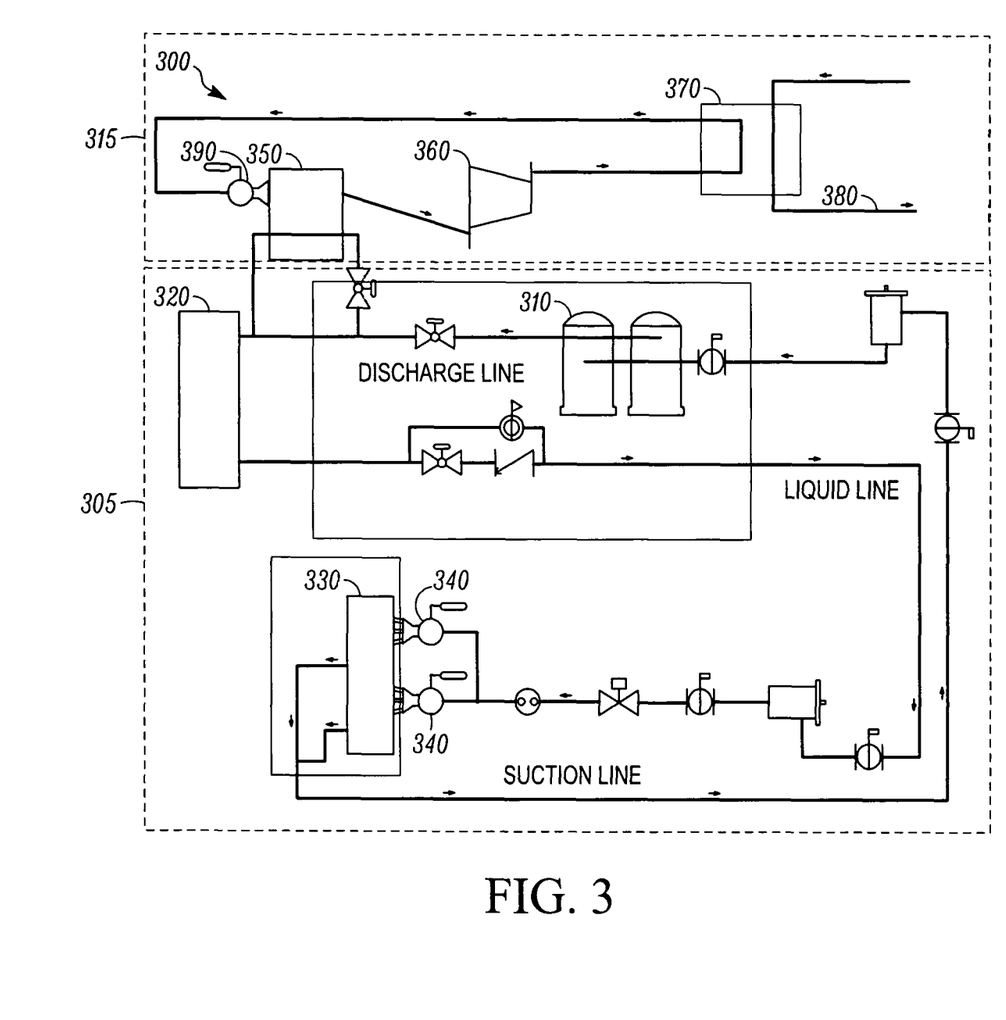
FIG. 3 is a schematic circuit of an embodiment of a vapor compression system which utilizes a low pressure refrigerant and which can provide high temperature hot water. The vapor compression system is configured as an embodiment of a cascade system.

In an embodiment, the compressor of the vapor compression system is an oil free compressor (see e.g. FIGS. 1 to 3). In an embodiment, the compressor is an oil free centrifugal compressor.

In an embodiment, a new or existing rooftop HVAC unit or equipment, a chiller, or a VRF/VWF system is utilized to recover the heat from compression to heat hot water to a high temperature. In an embodiment, the heat recovered can be used to heat directly the water to the high temperature hot water desired or be applied to a separate refrigeration cycle for hot water heating boosting.

As an example, when utilized in a multiple unit rooftop configuration the methods, systems, and apparatuses herein may be used year round on a rooftop that typically sees cooling needs. One example is a supermarket that has multiple rooftops used year round for cooling and heating in the same building. The hot water booster could be placed on one or two rooftops that typically run in cooling mode all year long. The booster would then provide hot water for either air reheat in the summer/shoulder seasons or hot water for cleaning or laundry needs.

In an embodiment, the separate cycle utilizes a heat exchange fluid, such as a low pressure refrigerant(s) capable of handling higher temperature without decomposing.

In an embodiment, some refrigerant(s) may be tailor made such that vapor compression ratios and cfm can be applied with existing medium pressure compressors (screws, scrolls, and/or reciprocating), such as for example in the re-purposing of an existing compressor for the application of obtaining high temperature hot water. In some examples, the refrigerant(s) selected may be based on modeling taking into account temperature and displacement.

The separate cycle with low pressure refrigerant(s) can allow compression and lift up to higher temperatures such that water may be heated to higher temperatures. The refrigerant(s) can allow for high temperature hot water heating at high COP values (4 to 7) versus some existing hot water heating methods (e.g. natural gas having COP values (0.7 to 0.94) and electrical having COP values (at about 0.98).

In an embodiment, the vapor compression refrigeration system in some instances may include the low pressure refrigerant such as for example R-1233zd(E) (trans-1-chloro-3,3,3 trifluoropropene). This system may, but is not limited to being utilized (1) as a standalone chiller utilizing medium temperature waste heat as the initial heat source, (2) as a cascaded chiller system that may utilize extremely low temperature waste heat to lift up or boost the temperature to high temperatures, or (3) in a system that utilizes waste heat from the heat of compression from an existing rooftop, chiller, or VRF/VWF system. The low pressure refrigerant(s) allow high temperature operation at low pressure, thereby allowing use of lower pressure compressors. In an embodiment, the systems herein can allow use of heat exchangers similar to existing R-134a designs further described hereinbelow.

In an embodiment of an oil free system, the oil free system enables operation without concern of oil management, oil breakdown, lubricity issues and/or oil retrieval at high temperatures.

As seen in FIGS. 1 to 4, there are multiple types of cycles that may be considered. It will be appreciated that the specific configurations shown in FIGS. 1 to 4 are not limiting, as other configurations of systems may be implemented to provide the source of heat for use to heat water to a high temperature with or without cascading.

Referring to FIG. 1, the vapor compression system 100 is a refrigeration cycle which includes a compressor 110, condenser 120, evaporator 130, expansion device 140 between the outlet of the condenser 120 and the inlet of the evaporator 130. Each of the condenser 120 and evaporator has water inlets and outlets respectively as indicated by the arrows. The system 100 can also employ one or more shutoff valves (e.g. as shown on the discharge line leaving compressor 110).

The vapor compression system 100 is a refrigeration cycle to provide high temperature hot water. In an embodiment, the refrigeration cycle in FIG. 1 is a chiller heat pump configuration where the system 100 utilizes a heat source in the evaporator 130 to vaporize a low pressure refrigerant (e.g. through heat exchange for example with water coming in and out of the evaporator 130, see e.g. large arrows in/out of evaporator 130 shown on the righthand side). The refrigerant is then lifted to a higher temperature/pressure via a compressor 110. In an embodiment, the compressor 110 is an oil free compressor. In an embodiment, the compressor 110 is an oil free centrifugal compressor. The higher pressure/temperature refrigerant from the compressor 110 then rejects the heat of compression via the condenser 120 to heat water (at 180). See e.g. large arrows in/out of condenser 120 shown on the lefthand side). This hot water is then supplied to the building/industrial process/water tank. The condensed refrigerant is then returned to the evaporator 130 to complete the cycle.

Referring to FIG. 2, the vapor compression system 200 is a refrigeration cycle which includes a compressor 210, condenser 220, evaporator 230, and expansion device 240 before the inlet of the evaporator 230. Each of the condenser 220 and evaporator has water inlets and outlets respectively as indicated by the arrows. The system 200 can also employ one or more shutoff valves (e.g. as shown on the discharge lines leaving compressor(s) 210, 260).

The vapor compression system 200 is a refrigeration cycle to provide high temperature hot water. The vapor compression system 200 utilizes a cascade cycle. The lower part 205 may utilize the compressor 210, which may be an oil-bearing or oil free compressor 210 to help lift low temperature waste heat from the evaporator 230 up to a cascading refrigerant to refrigerant heat exchanger 250. Heat exchange of the refrigerant cycling through the evaporator 230 is for example with water coming in and out of the evaporator 230, see e.g. large arrows in/out of evaporator 230 shown on the righthand side. The refrigerant from the lower part 205 heats up and evaporates the low pressure refrigerant in the upper portion 215 of the cascade. This refrigerant vapor is then pressurized and heated further via compressor 260. In an embodiment, the compressor 260 is an oil free compressor. In an embodiment, the compressor 210 is an oil free centrifugal compressor. This refrigerant heat is then transferred via the condenser 220 (e.g. shell and tube, plate frame, brazed plate, etc.) to a water stream that is supplied to for example a building/industrial process/water tank (see e.g. large arrows in/out of condenser 220 shown on the lefthand side).

In an embodiment, the refrigerant in the lower part 205 may be but is not limited to R-134a, R-513A, R-1234yf, R-1234ze, R-410A, R-452A, blends thereof, and the like, or other refrigerants.

In an embodiment, the refrigerant in the upper part 215 may be a low pressure refrigerant, such as for example R-1233zd(E) or the like, or other low pressure refrigerants that have high stability for use at high temperatures and do not decompose, and that have excellent efficiency and high coefficients of performance. For example, low pressure refrigerant(s) herein would not decompose and would have better stability at high temperatures than for example R-11, R-12, and R-123.

With further reference to FIG. 2, efficiency and capacity of the system 200 can be determined by assessment and modeling of certain state points of the lower part 205 and the upper part 215. In an embodiment, the state points are taken from different locations of the system and may in some circumstances assume little to no measurable pressure drop through the particular location assessed/modeled. In an embodiment, R134a is the heat exchange fluid in the lower part 205 and R-1233zd(E) is the heat exchange fluid in the upper part 215.

State points B of the heat exchange fluid in the lower part 205 can include:

B1: Point in the evaporator 230 where saturated refrigerant becomes all or substantially all vapor. Pressure can be determined from a given saturation temperature.

B1': Refrigerant stream leaving the evaporator 230 and entering the compressor 210 suction. The refrigerant at this point is either saturated vapor or superheated vapor as specified.

B2: Compressor 210 discharge and entering condenser state, for example superheated vapor.

B2': Point in the condenser (e.g. refrigerant to refrigerant heat exchanger 250) where entering vapor, e.g. superheated vapor, has been rejected and vapor reaches a specified saturation temperature. The pressure is determined from the given saturation temperature.

B3: Point in the condenser (e.g. refrigerant to refrigerant heat exchanger 250) where the refrigerant becomes substantially all or all liquid (quality x=0). In an embodiment, pressure is the same as at B2'.

B3': Refrigerant stream leaving the condenser (e.g. refrigerant to refrigerant heat exchanger 250) after additional subcooling (if present) as specified. In an embodiment, this is the state point entering the expansion device 240.

B4: State of the refrigerant stream leaving the expansion device 240 and entering the evaporator 230. In an embodiment, this state is in the two-phase region.

State points T of the heat exchange fluid in the upper part 215 can include:

T1: Point in the evaporator (e.g. refrigerant to refrigerant heat exchanger 250) where saturated refrigerant becomes all or substantially all vapor. Pressure can be determined from a given saturation temperature.

T1': Refrigerant stream leaving the evaporator e.g. refrigerant to refrigerant heat exchanger 250) and entering the compressor 260 suction. The refrigerant at this point is either saturated vapor or superheated vapor as specified T2: Compressor 260 discharge and entering condenser state, for example superheated vapor.

T2': Point in the condenser 220 where entering vapor, e.g. superheated vapor, has been rejected and vapor reaches a specified saturation temperature. The pressure is determined from the given saturation temperature.

T3: Point in the condenser 220 where the refrigerant becomes substantially all or all liquid (quality x=0). In an embodiment, pressure is the same as at T2'.

T3': Refrigerant stream leaving the condenser 220 after additional subcooling (if present) as specified. In an embodiment, this is the state point entering an expansion device from the liquid line.

T4: State of the refrigerant stream leaving the expansion device and entering the evaporator (e.g. refrigerant to refrigerant heat exchanger 250). In an embodiment, this state is in the two-phase region.

It will be appreciated that data may be obtained from the various state points, for example temperature and/or pressure to determine efficiency and capacity of the system. Based on certain observed state points, modeling has shown the following:

State point T1 has shown upper part 215 (stage) evaporator saturation temperatures that are lower than or at or about equal to lower part 205 (stage) condenser saturation temperature state point B3. In an embodiment, a target evaporator saturation temperature at T1 may be at or about 135° F. B3 is the temperature differential between the upper part 215 (stage) evaporator saturation temperature and the lower part 205 (stage) condensing saturation temperature in the refrigerant to refrigerant heat exchanger 250 that couples the two cycles.

State point T3 shows upper part 215 (stage) condenser saturation temperatures that are higher than leaving cooling fluid temperatures e.g. at T3'. In an embodiment, a target condenser saturation temperature at T3 may be at or about 185° F.

State point B1 shows the evaporator saturation temperature in the lower part 205 that is lower than the leaving chilled fluid temperature (e.g. leaving water) of the application. In an embodiment, a target evaporator saturation temperature at B1 may be at or about 69° F. (e.g. about 69.175)

COPs in the heating mode of the top stage or cycle have been observed at higher than 7.0, for example in some instances higher than 7.8 (e.g. 7.871). In some examples the cooling mode COP of the top cycle may be 1 less than the heating mode COP.

A mH/mL factor connecting the upper and lower part is observed to be higher than 1, for example as high or higher than 1.160), based on for example COP in the cooling mode is at or about 2.4 or higher and the heating mode is at or about 3.4 or higher.

Referring to FIG. 3, the vapor compression system 300 is a refrigeration cycle which includes a compressor 310, condenser 320, evaporator 330, expansion device 340 between the outlet of the condenser 320 and the inlet of the evaporator 330. Other components may also be present and which may also be implemented in the systems 100, 200 of FIGS. 1 and 2 above or in the system 400 of FIG. 4 as further described below. Each of the condenser 320 and evaporator may have water inlets and outlets similar to FIGS. 1 and 2 but are not shown. The system 300 can also employ one or more shutoff valves (e.g. as shown on discharge line between compressor(s) 310 and condenser 320).

In the lower part 305 of the vapor compression system 300 may reject the heat of compression to the upper part 315. In an embodiment, the lower part 305 of the vapor compression system 300 is represented as a unitary rooftop system surrounded by the black hash marks (but it will be appreciated that the lower part 305 may also be another type of refrigeration cycle equipment such as but not limited to a chiller or a VRF system). In the example of a unitary rooftop system, the vapor compression system 300 conducts the typical air cooling process by compressing refrigerant with the compressor 310, and rejecting the heat of compression to the air via an air cooled or water cooled condenser 320, flash through expansion valves 340 to a lower pressure, and then absorption of heat from the air to evaporate the refrigerant in the evaporator coil 330, and subsequently return to the suction of the compressor(s) 310. Heat exchange of the refrigerant cycling through the evaporator 330 is for example with water coming in and out of the evaporator 330.

In an embodiment, the refrigerant to refrigerant heat exchanger 350 takes waste heat from compression from the rooftop cycle (e.g. lower part 305) to heat up and evaporate a low pressure refrigerant in the upper part 315 (also represented by black hash marks). The evaporated low pressure refrigerant would then be pressurized/heated further in a compressor 360.

In an embodiment, the compressor 360 is an oil free compressor. In an embodiment, the compressor 360 is an oil free centrifugal compressor.

In an embodiment, the compressor 360 may pressurize/heat the refrigerant to near R-134a cfm levels or may be tailor made for the given refrigerant. In some examples, the refrigerant(s) selected may be based on modeling taking into account temperature and displacement.

This compressed and heated refrigerant is then used to heat up water to the desired temperature, such as at the water to refrigerant heat exchanger 370 in hot water loop 380. The subsequently condensed refrigerant is then returned to the cascade heat exchanger 350 by passing through an expansion valve 390.

In an embodiment, the hot water supply (e.g. hot water loop 380) may or may not require supplemental heating dependent upon the application. This supplemental heating may be done via typical gas or electrical heating. It will be appreciated that this may apply to any of the systems 100, 200, and/or 400 described further below.

In an embodiment, in the example of an oil free compressor, the compressor 360 may utilize different non-oil bearing technologies including magnetic levitation, refrigerant lubricated bearings or air bearings.

List of potential low pressure refrigerants to utilize within the high temperature heat pump cycles can include but are not limited to:

Trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1, 1 difluoroethene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; 1,2,2 trifluroroethene and mixtures thereof. It will be appreciated that these refrigerants and blends thereof may be implemented in any of the vapor compression systems herein, such as for example systems 100, 200, 300, and/or 400.

Figure 4:
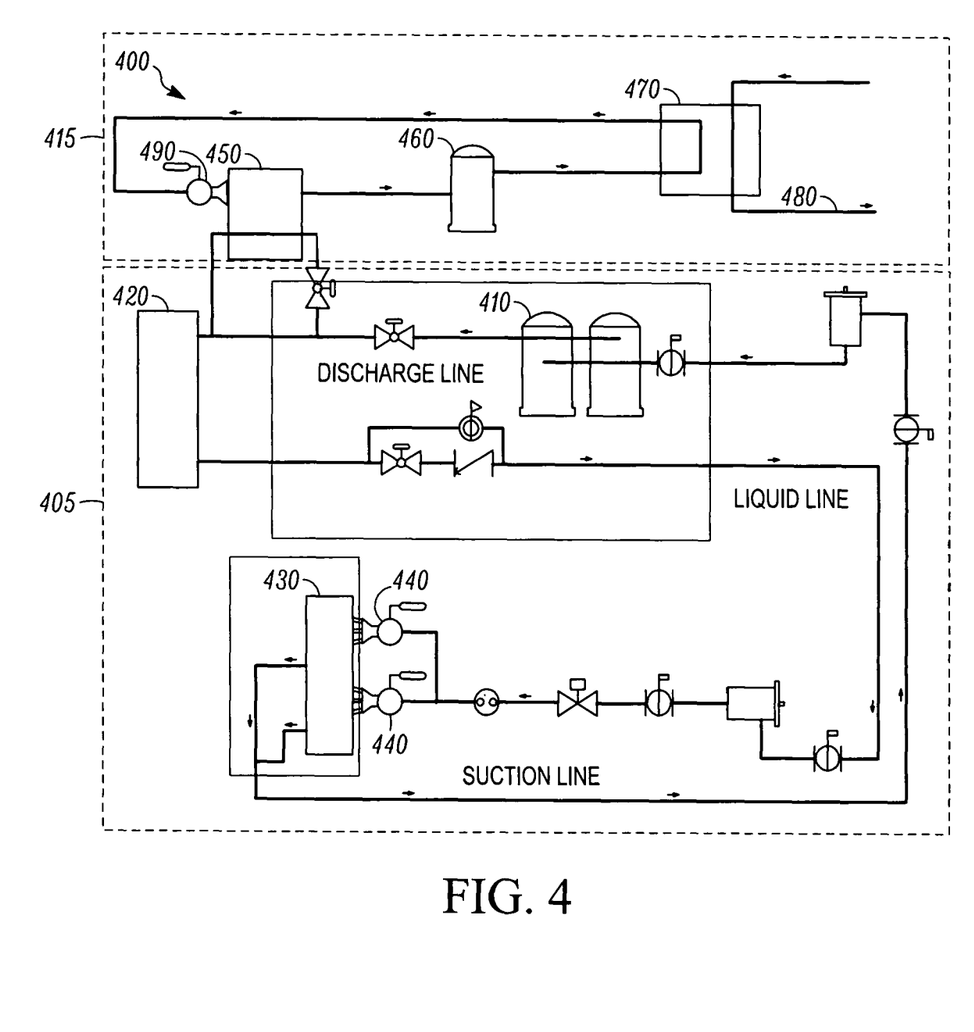
FIG. 4 is a schematic circuit of an embodiment of a vapor compression system which utilizes a low pressure refrigerant and which can provide high temperature hot water. The vapor compression system is configured as an embodiment of a cascade system.

In an embodiment, an existing refrigeration cycle or equipment such as for example a rooftop unit, chiller, or VRF/VWF system is used, where methods include capturing the heat from compression and applying it to a separate refrigeration cycle for hot water heating boosting. As seen in FIG. 4, another example of using a lower pressure refrigerant high temperature cycle enables lift up to high temperatures, but at low refrigerant pressures. In some cases such as shown in FIG. 4, the refrigerant(s) may allow use of existing medium pressure compressors.

Referring to FIG. 4, the vapor compression system 400 is a refrigeration cycle which includes a compressor 410, condenser 420, evaporator 430, expansion device 440 between the outlet of the condenser 420 and the inlet of the evaporator 430. Other components may also be present and which may also be implemented in the systems 100, 200, 300 of FIGS. 1-3 above. Each of the condenser 420 and evaporator may have water inlets and outlets similar to FIGS. 1 and 2. The system 340 can also employ one or more shutoff valves (e.g. as shown on the discharge line between compressor(s) 410 and condenser 420).

In an embodiment, the compressor 410 is an oil free compressor. In an embodiment, the compressor 410 is an oil free centrifugal compressor.

In FIG. 4, the lower part 405 of the vapor compression system 400 may reject the heat of compression to the upper part 415. In an embodiment, the lower part 405 of the vapor compression system 400 is represented as a unitary rooftop system surrounded by the black hash marks (but it will be appreciated that the lower part 405 may also be another type of refrigeration cycle equipment such as but not limited to a chiller or a VRF system). In the example of a unitary rooftop system, the vapor compression system 400 conducts the typical air cooling process by compressing refrigerant with the compressor 410, and rejecting the heat of compression to the air via an air cooled or water cooled condenser 420, flash through expansion valves 440 to a lower pressure, and then absorption of heat from the air to evaporate the refrigerant in the evaporator coil 430, and subsequently return to the suction of the compressor(s) 410. Heat exchange of the refrigerant cycling through the evaporator 430 is for example with water coming in and out of the evaporator 430.

The vapor compression system 400 involves utilization of a refrigerant to refrigerant heat exchanger 450 that takes waste heat from compression from the rooftop cycle (i.e. lower part 405) to heat up and evaporate a low pressure refrigerant in the upper part 415 (also represented by black hash marks). The evaporated low pressure refrigerant would then be pressurized/heated further in a compressor 460.

In an embodiment, the compressor 460 is an oil free compressor. In an embodiment, the compressor 460 is an oil free centrifugal compressor.

In an embodiment, the compressor 460 may pressurize/heat the refrigerant to near R-134a cfm levels or may be tailor made for the given refrigerant. In some examples, the refrigerant(s) selected may be based on modeling taking into account temperature and displacement.

In an embodiment, the compressor 460 is an R-134a compressor, such as for example a suitably configured scroll or screw compressor, which already exists. The architecture of the vapor compression system 400 may be such that the compressor 460 is a re-purposed R-134a compressor, in which a low pressure refrigerant is utilized. It will also be appreciated that the compressor 110 of FIG. 1 may be a re-purposed R134a compressor to its use with a low pressure refrigerant e.g. R-1233zd(E) or the like.

Referring back to FIG. 4, the compressed and heated refrigerant is then used to heat up water to the desired temperature, such as at the water to refrigerant heat exchanger 470 in hot water loop 480. The subsequently condensed refrigerant is then returned to the cascade heat exchanger 350 by passing through an expansion valve 490.

In an embodiment, the hot water supply (e.g. hot water loop 480) may or may not require supplemental heating dependent upon the application. This supplemental heating may be done via typical gas or electrical heating. It will be appreciated that this may apply to any of the systems 100, 200, and/or 300 described above.

List of potential refrigerants to utilize within the booster cycle of FIG. 4 include but are not limited to:

Trans-1-chloro-3,3,3 trifluoropropene; cis-1-chloro-3,3,3 trifluoropropene; 2-chloro-3,3,3 trifluoropropene; 1,1,di-chloro-3,3,3 trifluoropropene; trans-1,2 dichloro-3,3,3 trifluoropropene; cis-1,2 dichloro-3,3,3 trifluoropropene; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3, 3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4, 4,4 hexafluorobutene; trans-1,1,1,4,4,4 hexafluorobutene; 1, 1 difluoroethene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; 1,2,2 trifluroroethene and mixtures thereof.

With further reference to FIG. 4, efficiency and capacity of the system 400 can be determined by assessment and modeling of certain state points of the lower part 405 and the upper part 415. In an embodiment, the state points are taken from different locations of the system and may in some circumstances assume little to no measurable pressure drop through the particular location assessed/modeled. In an embodiment, R410a is the heat exchange fluid in the lower part 405 and R-1233zd(E) is the heat exchange fluid in the upper part 415.

State points B of the heat exchange fluid in the lower part 405 can include:

B1: Point in the evaporator 430 where saturated refrigerant becomes all or substantially all vapor. Pressure can be determined from a given saturation temperature.

B1': Refrigerant stream leaving the evaporator 430 and entering the compressor 410 suction. The refrigerant at this point is either saturated vapor or superheated vapor as specified.

B2: Compressor 410 discharge and entering condenser state, for example superheated vapor.

B2': Point in the condenser (e.g. refrigerant to refrigerant heat exchanger 450) where entering vapor, e.g. superheated vapor, has been rejected and vapor reaches a specified saturation temperature. The pressure is determined from the given saturation temperature.

B3: Point in the condenser (e.g. refrigerant to refrigerant heat exchanger 450) where the refrigerant becomes substantially all or all liquid (quality x=0). In an embodiment, pressure is the same as at B2'.

B3': Refrigerant stream leaving the condenser 420 after additional subcooling (if present) as specified. In an embodiment, this is the state point entering the expansion device 440.

B4: State of the refrigerant stream leaving the expansion device 440 and entering the evaporator 230. In an embodiment, this state is in the two-phase region.

State points T of the heat exchange fluid in the upper part 415 can include:

T1: Point in the evaporator (e.g. refrigerant to refrigerant heat exchanger 450) where saturated refrigerant becomes all or substantially all vapor. Pressure can be determined from a given saturation temperature.

T1': Refrigerant stream leaving the evaporator e.g. refrigerant to refrigerant heat exchanger 450) and entering the compressor 460 suction. The refrigerant at this point is either saturated vapor or superheated vapor as specified T2: Compressor 460 discharge and entering condenser state, for example superheated vapor.

T2': Point in the condenser 470 where entering vapor, e.g. superheated vapor, has been rejected and vapor reaches a specified saturation temperature. The pressure is determined from the given saturation temperature.

T3: Point in the condenser 470 where the refrigerant becomes substantially all or all liquid (quality x=0). In an embodiment, pressure is the same as at T2'.

T3': Refrigerant stream leaving the condenser 470 after additional subcooling (if present) as specified. In an embodiment, this is the state point entering an expansion device from the liquid line.

T4: State of the refrigerant stream leaving the expansion device 490 and entering the evaporator (e.g. refrigerant to refrigerant heat exchanger 450). In an embodiment, this state is in the two-phase region.

It will be appreciated that data may be obtained from the various state points, for example temperature and/or pressure to determine efficiency and capacity of the system. Based on certain observed state points, modeling has shown the following:

State point T1 has shown upper part 415 (stage) evaporator saturation temperatures that are lower than or at or about equal to lower part 405 (stage) condenser saturation temperature state point B3. In an embodiment, a target evaporator saturation temperature at T1 may be at or about 112° F. B3 is the temperature differential between the upper part 415 (stage) evaporator saturation temperature and the lower part 405 (stage) condensing saturation temperature in the refrigerant to refrigerant heat exchanger 450 that couples the two cycles.

State point T3 shows upper part 415 (stage) condenser saturation temperatures that are higher than leaving cooling fluid temperatures e.g. at T3'. In an embodiment, a target condenser saturation temperature at T3 may be at or about 185° F.

State point B1 shows the evaporator saturation temperature in the lower part 405 that is lower than the leaving chilled fluid temperature (e.g. leaving water) of the application. In an embodiment, a target evaporator saturation temperature at B1 may be at or about 52° F. (e.g. about 52.073)

COPs in the heating mode of the top stage or cycle have been observed at higher than 5.0, for example in some instances higher than 5.7 (e.g. 5.723). In some examples the cooling mode COP may be 1 less than the heating mode COP.

A mH/mL factor connecting the upper and lower part is observed to be higher than 1, for example as high or higher than 1.442), based on for example COP in the cooling mode is at or about 2.4 or higher and the heating mode is at or about 3.4 or higher.

In addition to the unitary rooftop depicted in FIG. 4, it is plausible to utilize the booster cycle in other refrigeration cycles such as chillers, VRF, VWF, stationary refrigeration cycles, or residential HVAC. In these cycles the waste heat of compression would again be utilized in a similar manner as depicted in FIG. 4. The lower part 405 would just be replaced by the different cycles or equipment types.

It will be appreciated that the high temperature hot water heating cycle herein may be useful for heating fluids other than water. Additionally, the high temperature hot water heating cycle may be implemented as a high temperature thermal storage for process applications, where unneeded heat may be stored in a phase change material (PCM) until it is needed.

Additionally, heat provided to the cascade booster heat exchanger (e.g. 250, 350, or 450) may come from a reversible heat pump configuration. For this application a direct cascaded system may be used (e.g. where the condenser coil 420 would be removed in FIG. 4). It will also be appreciated that a unitary or chiller reversible heat pump may make hot air or hot water for heating, and still provide some energy to the upper hot water heating booster cycle, e.g. upper part 415.

In the methods, systems, and apparatuses herein, existing hot water heat pump technologies may also be utilized in the lower part (e.g. 205, 305, 405, where some savings may be gained by providing boiler/hot water heater preheat.

The high temperature hot water heating cycle may be used for a rooftop system (e.g. stores, grocery). It will be appreciated that it may also be used in a modular booster refrigeration cycle on water cooled or air cooled chillers, and VRF/VWF products. It also could be used as a hot water heater for residential products. Other potential applications for use within process hot water heating are numerous, including but not limited to the following:

Food and Beverage—can washing, bottle washing, continuous cooker/cooler, pasteurizer, horizontal stationary retorts, equipment cleaning/sanitizing;

Hospital—boiler preheat for sterilization, dishwashing, laundry;

Any water preheating for boiling applications; and

Hot water transformation via waste heat recovered from air compressors, where the application could utilize oil free refrigeration compressor or oil bearing refrigeration compressors, for example solar hot water heating/transformation.

Aspects:

Any one or more of aspects 1 to 11 may be combined with any one or more of aspects 12 to 23, aspect 12 may be combined with any one or more of aspects 13 to 23.

1. A refrigeration system, comprising:
   a first refrigeration cycle having a first heat exchange fluid; and
   a second refrigeration cycle having a second heat exchange fluid,
   the second heat exchange fluid having a relatively lower pressure than the first heat exchange fluid,
   the second refrigeration cycle is in a heat exchange relationship with the first refrigeration cycle, such that the first refrigeration cycle providing a source of heat to the second refrigeration cycle, the second refrigeration cycle configured to heat water using, as a boost, the source of heat from the first refrigeration cycle.

2. The system of aspect 1, wherein the first heat exchange fluid is a refrigerant and the second heat exchange fluid is a refrigerant.

3. The system of aspect 1 or 2, wherein the first heat exchange fluid is at least one selected from the group consisting of R-134a, R-513A, R-1234yf, R-1234ze, R-410A, and R-452A.

4. The system of any one or more of aspects 1 to 3, wherein the second heat exchange fluid is at least one selected from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4, 4,4 hexafluorobutene; trans-1,1,1,4,4,4 hexafluorobutene; 1,1,3,3 tetrafluoropropane; 1,1,1,2,3 pentafluoropropane; 1,1,2,3,3 pentafluoropropane; 1,1,1,3,3 pentafluoropropane;

1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1, 1 difluoroethene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; and 1,2,2 trifluroroethene.

5. The system of any one or more of aspects 1 to 4, wherein the source of heat from the first refrigeration cycle is waste heat or heat that may otherwise be rejected or that would not have been recovered.

6. The system of any one or more of aspects 1 to 5, wherein the first refrigeration cycle is selected from a rooftop machine, a unitary rooftop machine, a chiller, a variable refrigerant flow (VRF) machine, and/or variable water flow (VWF) machine, a HVAC system or unit or equipment.

7. The system of any one or more of aspects 1 to 6, wherein the second refrigeration cycle is configured to heat water using, as a boost, the source of heat from the first refrigeration cycle, where the water heated by the second refrigeration cycle is in the range of 160° F. to 200° F.

8. The system of any one or more of aspects 1 to 7, where one or both of the first refrigeration cycle and the second refrigeration cycle is an oil free system, where a compressor of the respective first refrigeration cycle and/or second refrigeration cycle does not employ oil.

9. The system of any one or more of aspects 1 to 8, wherein the second refrigeration cycle is in a heat exchange relationship with the first refrigeration cycle through a heat exchanger that takes heat rejected by the first heat exchange fluid to heat up and evaporate the second heat exchange fluid.

10. The system of any one or more of aspects 1 to 9, wherein the second refrigeration cycle includes an oil free compressor, a condenser, an evaporator, and an expansion device between the outlet of the condenser and the inlet of the evaporator.

11. The system of aspect 10, wherein the oil free compressor is an oil free centrifugal compressor.

12. A method of heating water, comprising:
  evaporating a refrigerant;
  compressing the evaporated refrigerant;
  rejecting heat from the compressed refrigerant to condense the refrigerant; and
  heating water with the rejected heat from the condensed refrigerant, such that
    the heating water heats water in the range of 160° F. to 200° F.,
    the refrigerant being a relatively low pressure refrigerant suitable to heat water to the range of 160° F. to 200° F.,
    the refrigerant is selected from at least one from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,3,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1, 1 difluoroethene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; and 1,2,2 trifluroroethene.

13. A method of heating water, comprising:
  evaporating a first heat exchange fluid in a first refrigeration cycle;
  compressing the evaporated first heat exchange fluid in the first refrigeration cycle;
  rejecting heat from the compressed first heat exchange fluid to condense the first heat exchange fluid, the rejecting of heat from the compressed first heat exchange fluid includes a heat exchange relationship with a second heat exchange fluid in a second refrigeration cycle and vaporizing the second heat exchange fluid in the second refrigeration cycle;
  compressing the vaporized second heat exchange fluid in the second refrigeration cycle; and
  heating water with the compressed second heat exchange fluid and condensing the compressed second heat exchange fluid,
    the second heat exchange fluid having a relatively lower pressure than the first heat exchange fluid, where the first heat exchange fluid from the first refrigeration cycle providing a source of heat to the second refrigeration cycle, and where the second refrigeration cycle configured to heat the water using, as a boost, the source of heat from the first refrigeration cycle.

14. The method of aspect 13, wherein the first heat exchange fluid is a refrigerant and the second heat exchange fluid is a refrigerant.

15. The method of aspect 13 or 14, wherein the first heat exchange fluid is at least one selected from the group consisting of R-134a, R-513A, R-1234yf, R-1234ze, R-410A, and R-452A.

16. The method of any one or more of aspects 13 to 15, wherein the second heat exchange fluid is at least one selected from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1, 1 difluoroethene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; and 1,2,2 trifluroroethene.

17. The method of any one or more of aspects 13 to 16, wherein the source of heat from the first refrigeration cycle is waste heat or heat that may otherwise be rejected or that would not have been recovered.

18. The method of any one or more of aspects 13 to 17, wherein the first refrigeration cycle is selected from a rooftop machine, a unitary rooftop machine, a chiller, a variable refrigerant flow (VRF) machine, and/or variable water flow (VWF) machine, a HVAC system or unit or equipment.

19. The method of any one or more of aspects 13 to 18, wherein the second refrigeration cycle is configured to heat the water using, as a boost, the source of heat from the first refrigeration cycle, where the water heated by the second refrigeration cycle is in the range of 160° F. to 200° F.

20. The method of any one or more of aspects 13 to 19, where one or both of the first refrigeration cycle and the second refrigeration cycle is an oil free system, where a compressor of the respective first refrigeration cycle and/or second refrigeration cycle does not employ oil.

21. The method of any one or more of aspects 13 to 20, wherein the second refrigeration cycle is in a heat exchange relationship with the first refrigeration cycle through a heat exchanger that takes heat rejected by the first heat exchange fluid to heat up and evaporate the second heat exchange fluid.

22. The method of any one or more of aspects 13 to 21, wherein the second refrigeration cycle includes an oil free compressor, a condenser, an evaporator, and an expansion device between the outlet of the condenser and the inlet of the evaporator.

23. The method of any one or more of aspects 13 to 22, wherein the oil free compressor is an oil free centrifugal compressor.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A refrigeration system, comprising:
a first refrigeration cycle having a first refrigerant, the first refrigeration cycle including a condenser that cools the first refrigerant and rejects heat in a cooling mode, and the rejected heat in a heat transfer relationship with air; and
a second refrigeration cycle having a second refrigerant, the second refrigerant having a relatively lower pressure than the first refrigerant,
the second refrigeration cycle is in a heat exchange relationship with the first refrigeration cycle operating in the cooling mode through a heat exchanger that uses heat from the first refrigerant to heat up and evaporate the second refrigerant, such that the first refrigeration cycle providing a source of heat to the second refrigeration cycle, the second refrigeration cycle configured to heat water using, as a boost, the source of heat from the first refrigeration cycle.

2. The system of claim 1, wherein the first refrigerant is at least one selected from the group consisting of R-134a, R-513A, R-1234yf, R-1234ze, R-410A, and R-452A.

3. The system of claim 1, wherein the second refrigerant is at least one selected from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3, 3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4, 4,4 hexafluorobutene; trans-1,1,1,4,4,4 hexafluorobutene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5, 5,5-octafluoropent-2-ene; trifluoroiodomethane; and 1,2,2 trifluroroethene.

4. The system of claim 1, wherein the source of heat from the first refrigeration cycle is waste heat or heat that may otherwise be rejected or that would not have been recovered.

5. The system of claim 1, wherein the first refrigeration cycle is selected from a rooftop machine, a unitary rooftop machine, a chiller, a variable refrigerant flow (VRF) machine, and/or variable water flow (VWF) machine, a HVAC system or unit or equipment.

6. The system of claim 1, wherein the second refrigeration cycle is configured to heat water using, as a boost, the source of heat from the first refrigeration cycle, where the water heated by the second refrigeration cycle is in the range of 160° F. to 200° F.

7. The system of claim 1, where one or both of the first refrigeration cycle and the second refrigeration cycle is an oil free system, where a compressor of the respective first refrigeration cycle and/or second refrigeration cycle does not employ oil.

8. The system of claim 1, wherein the second refrigeration cycle includes an oil free compressor, a condenser, an evaporator, and an expansion device between the outlet of the condenser and the inlet of the evaporator.

9. The system of claim 8, wherein the oil free compressor is an oil free centrifugal compressor.

10. A method of heating water, comprising:
evaporating a first refrigerant in a cooling mode;
compressing the evaporated first refrigerant in the cooling mode;
rejecting heat from the compressed first refrigerant to condense the first refrigerant in the cooling mode which includes:
rejecting a first portion of the heat from the compressed first refrigerant to a second refrigerant through a heat exchanger, and rejecting a second portion of the heat from the compressed first refrigerant through a condenser, the rejected second portion of heat in a heat transfer relationship with air; and heating water, via the second refrigerant, with the first portion of the rejected heat from the compressed first refrigerant, such that the heating water heats water in the range of 160° F. to 200° F., the second refrigerant being a relatively low pressure refrigerant suitable to heat water to the range of 160° F. to 200° F., and the second refrigerant is selected from at least one from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; and 1,2,2 trifluroroethene.

11. A method of heating water, comprising:

evaporating a first refrigerant in a first refrigeration cycle in a cooling mode;

compressing the evaporated first refrigerant in the first refrigeration cycle in the cooling mode;

rejecting heat from the compressed first refrigerant to condense the first refrigerant in the cooling mode, wherein the rejecting of heat from the compressed first refrigerant in the cooling mode includes:

the first refrigerant in a heat exchange relationship with a second refrigerant in a second refrigeration cycle through a heat exchanger and vaporizing the second refrigerant in the second refrigeration cycle, and a condenser in the first refrigeration cycle cooling the first refrigerant and rejecting heat, the rejected heat from the condenser in a heat exchange relationship with air;

compressing the vaporized second refrigerant in the second refrigeration cycle; and heating water with the compressed second refrigerant and condensing the compressed second refrigerant, the second refrigerant having a relatively lower pressure than the first refrigerant, where the first refrigerant from the first refrigeration cycle providing a source of heat to the second refrigerant, and where the second refrigeration cycle configured to heat the water using, as a boost, the source of heat from the first refrigeration cycle.

12. The method of claim 11, wherein the first refrigerant is at least one selected from the group consisting of R-134a, R-513A, R-1234yf, R-1234ze, R-410A, and R-452A.

13. The method of claim 11, wherein the second refrigerant is at least one selected from the group consisting of trans-1-chloro-3,3,3 trifluoropropene; cis-1-chloro-3,3,3 trifluoropropene; 2-chloro-3,3,3 trifluoropropene; 1,1,dichloro-3,3,3 trifluoropropene; trans-1,2 dichloro-3,3,3 trifluoropropene; cis-1,2 dichloro-3,3,3 trifluoropropene; 1,1,3,3 tetrafluoropropane; 1,1,1,2,3 pentafluoropropane; 1,1,2,3,3 pentafluoropropane; 1,1,1,3,3 pentafluoropropane; 1,1,1,2,2 pentafluoropropane; 1,1,1,2,2,3 hexafluoropropane; 1,1,1,2,3,3 hexafluoropropane; 1,1,1,3,3,3 hexafluoropropane; propane; butane; isobutene; isopentane; pentane; cyclopentane; 1, 1 difluoroethane; 1,2-difluoroethane; difluoromethane; 1,1,1,2 tetrafluoroethane; trans-1,3,3,3 tetrafluoropropene; cis-1,3,3,3 tetrafluoropropene; 2,3,3,3 tetrafluoropropene; 1,1,2 trichloro-3,3,3 trifluoropropene; trans-1,2 dichloroethylene; cis-1,2 dichloroethylene; 1,1 dichloroethylene; cis-1,1,1,4,4,4 hexafluorobutene; trans-1,1,1,4,4,4 hexafluorobutene; 1,2-difluoroethene; 1,1,1,2 tetrafluoroethane; 1,1,2,2 tetrafluoroethane; 1,1 difluoroethene; trans-1,2 difluoroethene; cis-1,2 difluoroethene; Z-1-chloro-2,3,3,3-tetrafluoropropene; E-1-chloro-2,3,3,3-tetrafluoropropene; E-1,1,1,4,4,5,5,5-octafluoropent-2-ene; trifluoroiodomethane; and 1,2,2 trifluroroethene.

14. The method of claim 11, wherein the source of heat from the first refrigeration cycle is waste heat or heat that may otherwise be rejected or that would not have been recovered.

15. The method of claim 11, wherein the first refrigeration cycle is selected from a rooftop machine, a unitary rooftop machine, a chiller, a variable refrigerant flow (VRF) machine, and/or variable water flow (VWF) machine, a HVAC system or unit or equipment.

16. The method of claim 11, wherein the second refrigeration cycle is configured to heat the water using, as a boost, the source of heat from the first refrigeration cycle, where the water heated by the second refrigeration cycle is in the range of 160° F. to 200° F.

17. The method of claim 11, where one or both of the first refrigeration cycle and the second refrigeration cycle is an oil free system, where a compressor of the respective first refrigeration cycle and/or second refrigeration cycle does not employ oil.

18. The method of claim 11, wherein the second refrigeration cycle includes an oil free compressor, a condenser, an evaporator, and an expansion device between the outlet of the condenser and the inlet of the evaporator.

19. The method of claim 18, wherein the oil free compressor is an oil free centrifugal compressor.

* * * * *